(12) United States Patent
Saito (10) Patent No.: US 12,234,676 B2
(45) Date of Patent: Feb. 25, 2025

(54) LOCKING DEVICE

(71) Applicant: PIOLAX, INC., Kanagawa (JP)

(72) Inventor: Jun Saito, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 157 days.

(21) Appl. No.: 18/011,726

(22) PCT Filed: Jun. 23, 2021

(86) PCT No.: PCT/JP2021/023838
§ 371 (c)(1),
(2) Date: Dec. 20, 2022

(87) PCT Pub. No.: WO2022/004532
PCT Pub. Date: Jan. 6, 2022

(65) Prior Publication Data
US 2023/0313560 A1    Oct. 5, 2023

(30) Foreign Application Priority Data
Jun. 30, 2020   (JP) ................................ 2020-113367

(51) Int. Cl.
*E05C 9/04* (2006.01)
*E05B 15/10* (2006.01)
(Continued)

(52) U.S. Cl.
CPC ................ *E05C 9/04* (2013.01); *E05B 15/10* (2013.01); *E05B 63/20* (2013.01); *E05B 83/32* (2013.01)

(58) Field of Classification Search
CPC .... E05B 1/0038; E05B 15/10; E05B 63/0052; E05B 63/20; E05B 63/202; E05B 63/248;
(Continued)

(56) References Cited

U.S. PATENT DOCUMENTS 8,033,582 B2 * 10/2011 Sawatani ................ E05B 83/30
292/159
8,590,351 B2 * 11/2013 Ookawara ............... E05C 9/047
292/37
(Continued)

FOREIGN PATENT DOCUMENTS

CN        110159108 A      8/2019
JP      2010-150854 A      7/2010
(Continued)

OTHER PUBLICATIONS

Aug. 10, 2021, International Search Report issued for related PCT Application No. PCT/JP2021/023838.
(Continued)

*Primary Examiner* — Christopher J Boswell
(74) *Attorney, Agent, or Firm* — Paratus Law Group, PLLC (57) ABSTRACT

There is provided a locking device including: a base member; a lock bar member; and a drive member. The base member includes a pair of facing surfaces sandwiching and supporting the lock bar member. The lock bar member includes a lock portion, a first bar portion extending in a sliding direction of the lock bar member, and a second bar portion extending in a direction intersecting the sliding direction and connecting the first bar portion and the lock portion. A first stepped portion is formed on the first bar portion, and a second stepped portion is formed on the second bar portion. Each of the facing surfaces is provided with step portions each of which faces the first stepped portion and the second stepped portion respectively in the direction intersecting the sliding direction at positions sandwiched between the first stepped portion and the second stepped portion.

6 Claims, 8 Drawing Sheets

(51) Int. Cl.
   *E05B 63/20*      (2006.01)
   *E05B 83/32*      (2014.01)
(58) Field of Classification Search
   CPC . E05B 83/28; E05B 83/30; E05C 9/04; E05C 9/043; E05C 9/047
   See application file for complete search history.

(56) References Cited

U.S. PATENT DOCUMENTS

| | | | |
|---|---|---|---|
| 9,556,654 B2* | 1/2017 | Fukumoto | E05B 83/28 |
| 10,132,108 B2* | 11/2018 | Shimizu | E05B 63/248 |
| 11,454,054 B2* | 9/2022 | Kondo | E05C 9/043 |
| 2002/0171248 A1* | 11/2002 | Diss | E05B 83/30 |
| | | | 292/164 |
| 2015/0028602 A1 | 1/2015 | Shimizu et al. | |
| 2019/0048626 A1 | 2/2019 | Shimizu et al. | |
| 2021/0095498 A1* | 4/2021 | Kondo | E05C 9/043 |
| 2023/0313577 A1* | 10/2023 | Ishii | E05C 9/10 |
| | | | 292/33 |

FOREIGN PATENT DOCUMENTS

| JP | 2012-225075 A | 11/2012 |
|---|---|---|
| WO | WO 2013/129100 A1 | 9/2013 |

OTHER PUBLICATIONS

Aug. 10, 2021, International Search Opinion issued for related PCT Application No. PCT/JP2021/023838.

* cited by examiner

LOCKING DEVICE

CROSS REFERENCE TO PRIOR APPLICATION

This application is a National Stage Patent Application of PCT International Patent Application No. PCT/JP2021/023838 (filed on Jun. 23, 2021) under 35 U.S.C. § 371, which claims priority to Japanese Patent Application No. 2020-113367 (filed on Jun. 30, 2020), which are all hereby incorporated by reference in their entirety.

TECHNICAL FIELD

The present invention relates to a locking device to be attached to an opening and closing body that can open and close an opening of a fixed body.

BACKGROUND ART

Patent Literature 1 discloses a locking device provided on a lid member of a console box of a vehicle. The locking device includes a base, an operation member slidably supported by the base, a rod member that slides in conjunction with the operation member, and an interlocking unit that interlocks the operation member and the rod member. The rod member includes a first lever portion and a second lever portion that extend in a left-right direction, and a connection portion that connects the first lever portion and the second lever portion in an upper-lower direction.

CITATION LIST

Patent Literature

Patent Document 1: JP2012-225075A

SUMMARY OF INVENTION

Technical Problem

In a case where the rod member described in Patent Literature 1 is formed to be long in the upper-lower direction, the rod member that hits the console box when the lid body is closed tends to tilt, and the rod member may be difficult to slide.

An object of the present invention is to provide a technique for stabilizing an operation of a lock bar member when closing an opening and closing body.

Solution to Problem

In order to solve the above problem, a locking device according to one aspect of the present invention is a locking device to be attached to an opening and closing body configured to open and close an opening of a fixed body, the locking device including: a base member: a lock bar member slidably supported by the base member; and a drive member configured to slide the lock bar member by moving in response to an operation of a user. The base member includes a pair of facing surfaces sandwiching and supporting the lock bar member. The lock bar member includes a lock portion engageable with and disengageable from a lock hole of the fixed body, a first bar portion extending in a sliding direction of the lock bar member, and a second bar portion extending in a direction intersecting the sliding direction and connecting the first bar portion and the lock portion. A first stepped portion is formed on the first bar portion, and a second stepped portion is formed on the second bar portion. Each of he facing surfaces is provided with step portions each of which faces the first stepped portion and the second stepped portion respectively in the direction intersecting the sliding direction at positions sandwiched between the first stepped portion and the second stepped portion.

Advantageous Effects of Invention

According to the present invention, it is possible to provide a technique for stabilizing an operation of a lock bar member when closing an opening and closing body.

DESCRIPTION OF EMBODIMENTS

Figure 1:
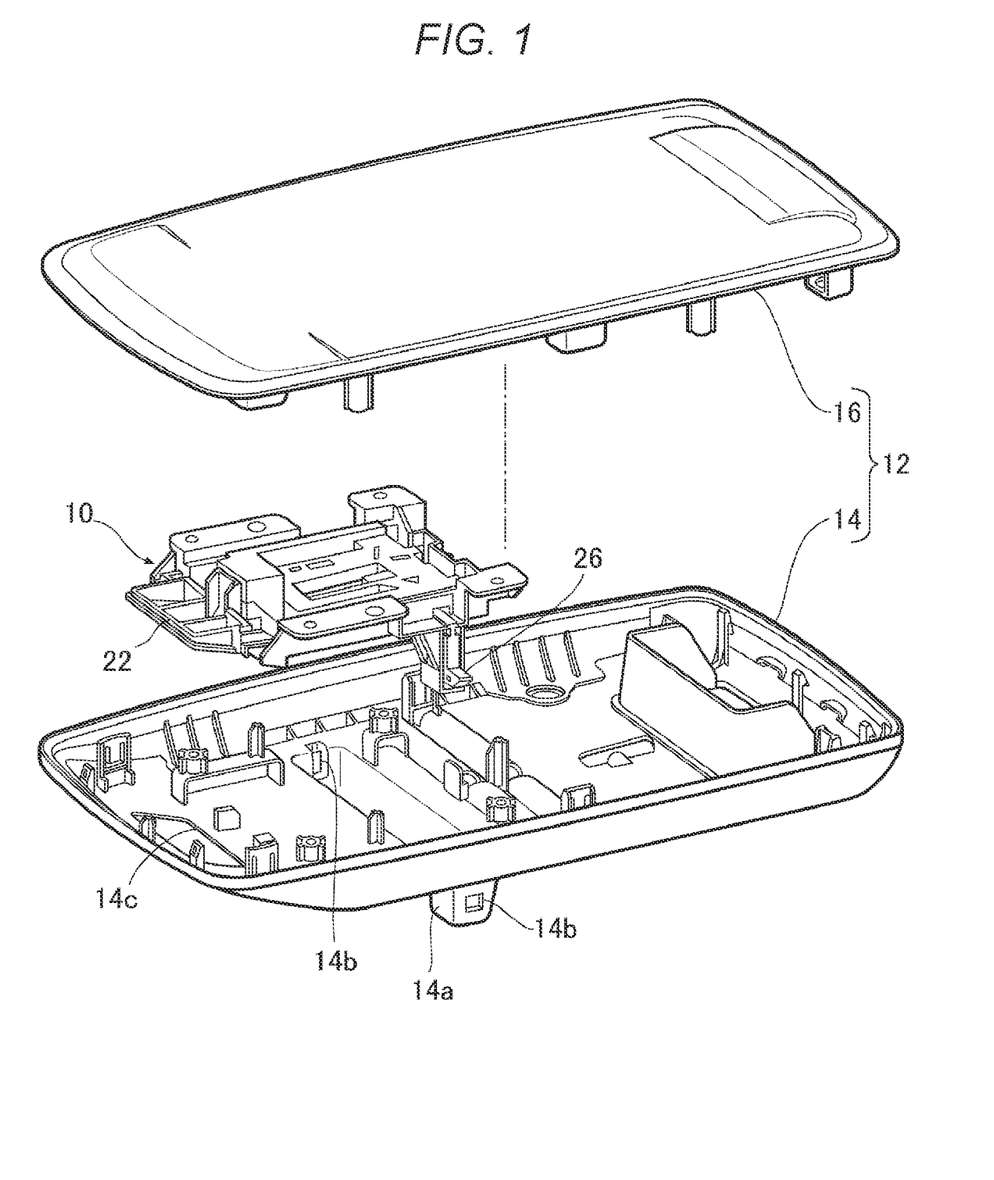
FIG. 1 is a view illustrating a state where a locking device according to an embodiment is attached to an opening and closing body.

FIG. 1 is a view illustrating a state where a locking device 10 according to an embodiment is attached to an opening and closing body 12. In FIG. 1, the opening and closing body 12 is shown as being disassembled into a first opening and closing member 14 and a second opening and closing member 16.

The opening and closing body 12 is provided so as to be able to open and close an opening of a fixed body (not shown) such as a console box provided in a vehicle, and functions as a lid. The opening and closing body 12 is formed by overlapping the first opening and closing member 14 and the second opening and closing member 16, and accommodates the locking device 10 therein. The locking device 10 is attached to the opening and closing body 12, and is locked in a state where the opening and closing body 12 closes the opening of the fixed body.

The first opening and closing member 14 is located on a back side, and the second opening and closing member 16 is located on a front side. The first opening and closing member 14 includes a tubular portion 14a, insertion holes 14b, and an exposure opening 14c. The tubular portion 14a is formed to protrude from a lower surface of the first opening and closing member 14, and the insertion holes 14b are formed in side surfaces of the tubular portion 14a. Front ends of lock bar members 26 of the locking device 10 are inserted into the insertion holes 14b. In this way, by disposing the lock bar members 26 in the tubular portion Ha, a volume of the first opening and closing member 14 that enters an accommodation space of the fixed body is reduced, and an accommodation amount of the fixed body can be sufficiently secured.

The exposure opening 14c is formed on a lower surface of a front end side of the first opening and closing member 14, and exposes an operation member 22 of the locking device 10. As a result, a user can operate the operation member 22 to release the lock of the locking device 10.

Figure 2:
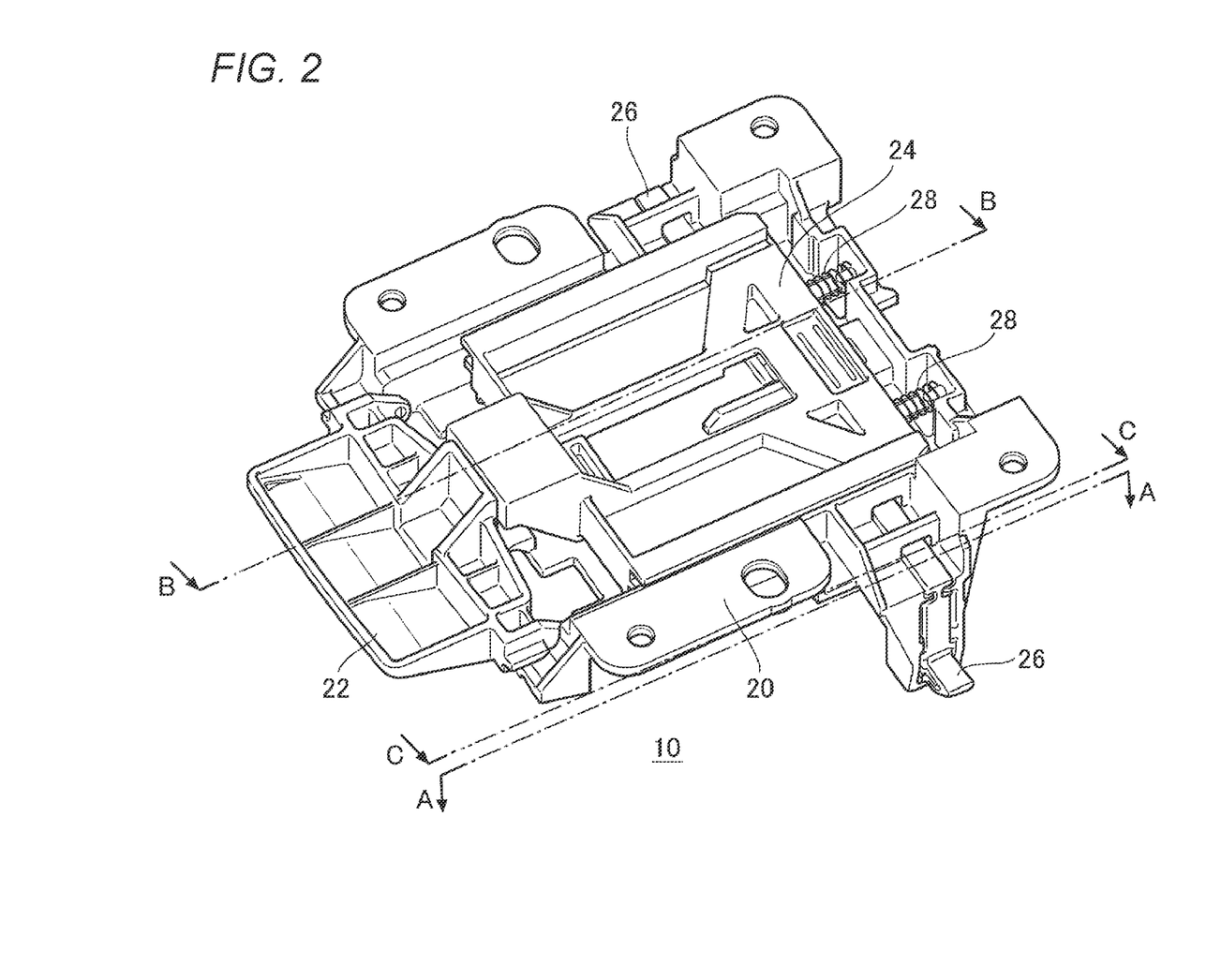
FIG. 2 is a perspective view of the locking device according to the embodiment.
Figure 3:
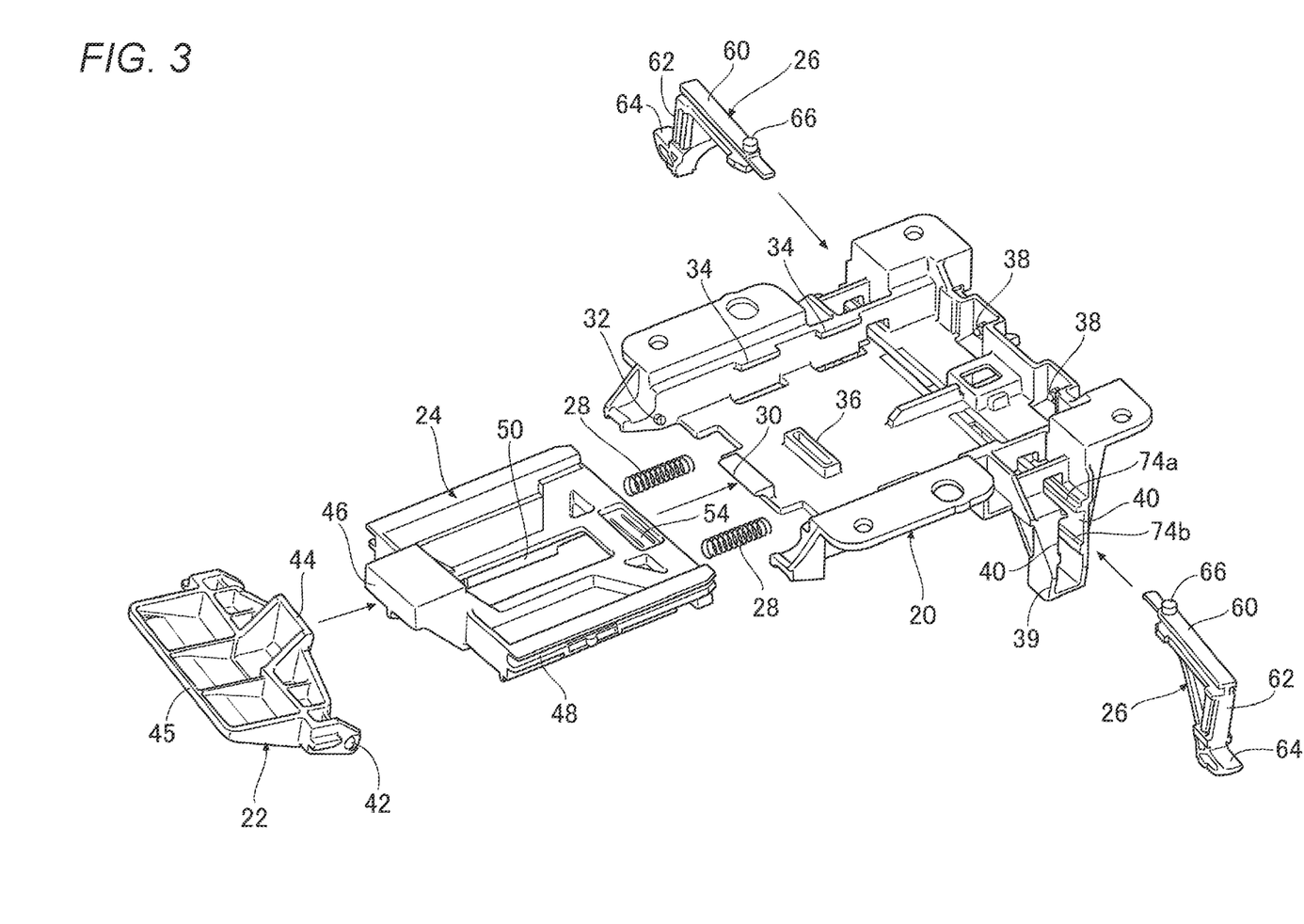
FIG. 3 is an exploded view of the locking device according to the embodiment.

FIG. 2 is a perspective view of the locking device 10 according to the embodiment. FIG. 3 is an exploded view of the locking device 10 according to the embodiment. The locking device 10 includes a base member 20, the operation member 22, a drive member 24, the lock bar members 26, and a spring member 28.

The base member 20 supports the operation member 22, the drive member 24, the lock bar members 26, and the spring member 28, and is fixed to the opening and closing body 12. The operation member 22 rotates in response to an operation of the user. The drive member 24 is movably supported by the base member 20, and moves in response to the rotation of the operation member 22, that is, in response to the operation of the user. The lock bar member 26 is slidably supported by the base member 20, and slides in response to the movement of the drive member 24.

The spring member 28 biases the drive member 24 and moves the lock bar member 26 in a direction in which the lock bar member 26 enters a lock hole of the fixed body, that is, in a lock direction. These members will be described with reference to new drawings.

Figure 4:
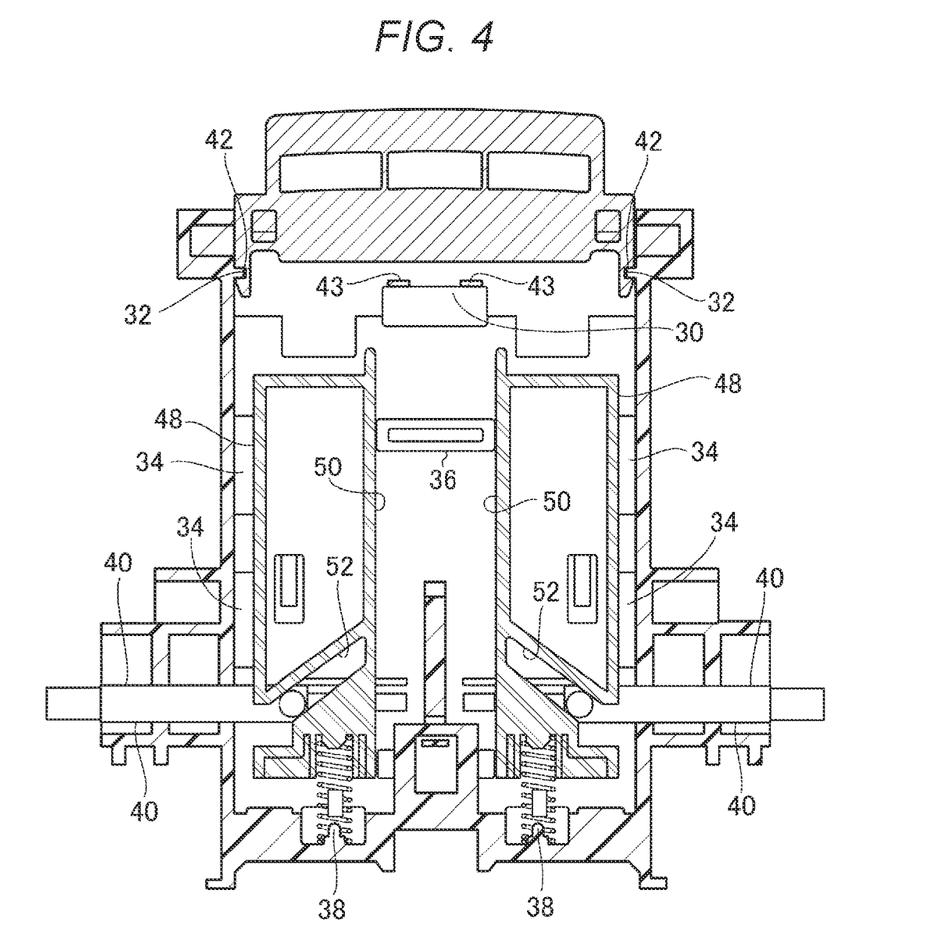
FIG. 4 is a cross-sectional view taken along a line A-A of the locking device shown in FIG. 2.
Figure 5:
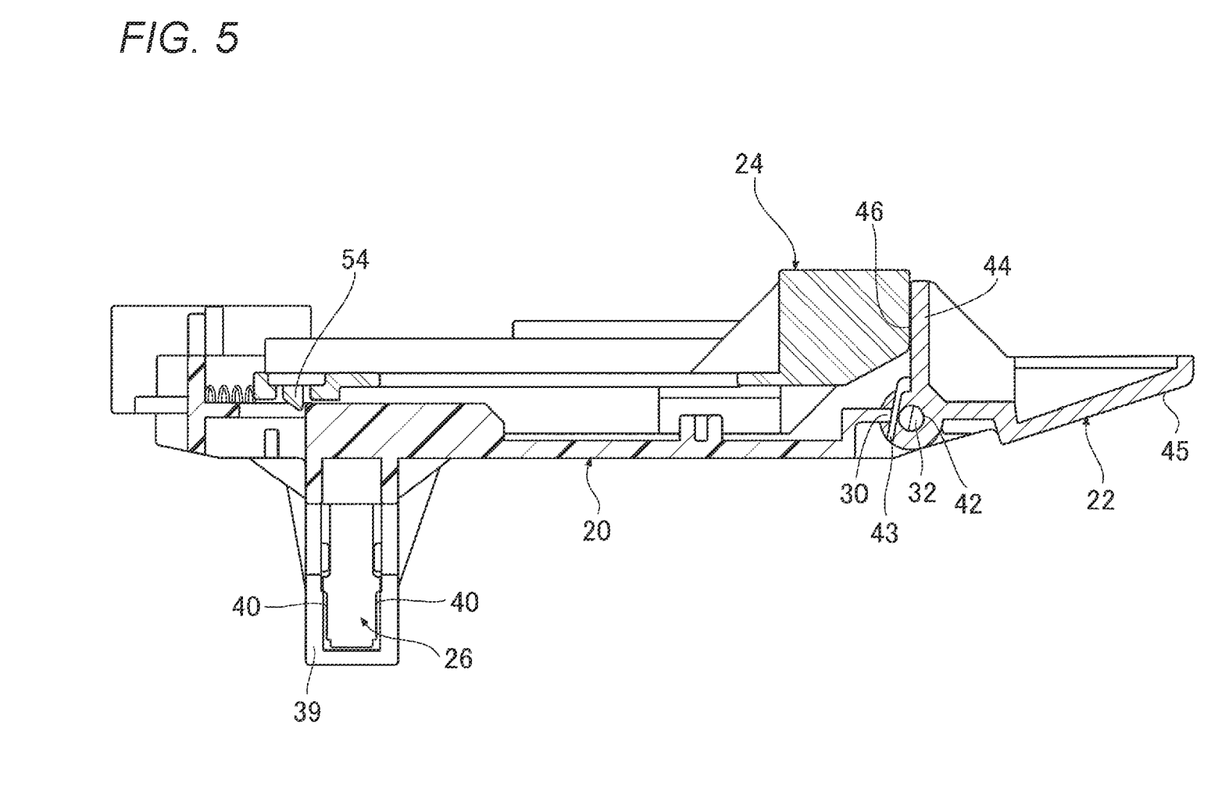
FIG. 5 is a cross-sectional view taken along a line B-B of the locking device shown in FIG. 2.
Figure 6:
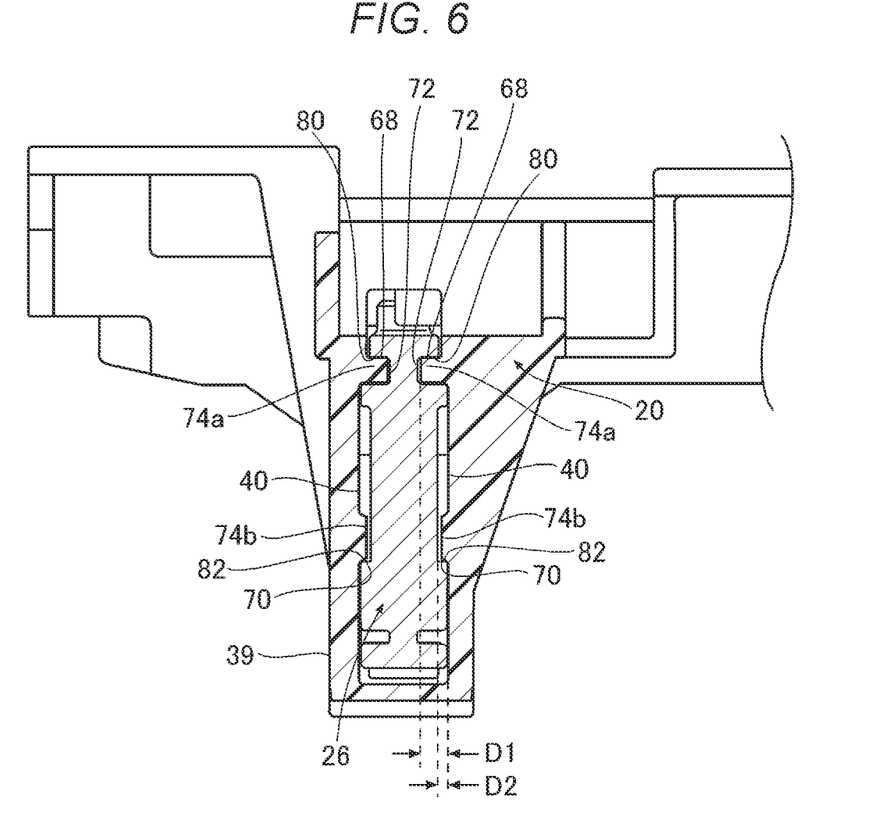
FIG. 6 is a cross-sectional view taken along a line C-C of the locking device shown in FIG. 2.

FIG. 4 is a cross-sectional view taken along a line A-A of the locking device 10 shown in FIG. 2. FIG. 5 is a cross-sectional view taken along a line B-B of the locking device 10 shown in FIG. 2. FIG. 6 is a cross-sectional view taken along a line C-C of the locking device 10 shown in FIG. 2.

The base member 20 includes a receiving portion 30, shaft support portions 32, rail portions 34, a guide portion 36, spring support portions 38, facing surfaces 40, first protruding portions 74a, and second protruding portions 74b. The receiving portion 30 shown in FIG. 5 is located at one end of the base member 20 and is contactable with the operation member 22. The shaft support portion 32 shown in FIG. 4 rotatably supports the operation member 22. The rail portions 34 are formed so as to protrude inward from both sides of the base member 20, and engage with the drive member 24 to guide the movement of the drive member 24.

The guide portion 36 shown in FIG. 4 is erected on a bottom surface of the base member 20, is positioned at the center of the base member 20, and guides the movement of the drive member 24. The spring support portions 38 are located on the other end of the base member 20 and support the spring member 28.

Box-shaped portions 39 shown in FIG. 5 are formed so as to hang down from a bottom portion of the base member 20 on both sides respectively. A pair of facing surfaces 40 is formed on an inner surface of the box-shaped portion 39 so as to face each other, and the pair of facing surfaces 40 is formed on both sides of the base member 20, respectively. The lock bar member 26 is formed between the pair of facing surfaces 40. On the facing surface 40 shown in FIG. 3, the first protruding portion 74a and the second protruding portion 74b (referred to as "protrusion 74" when they are not distinguished from each other) separated from each other in the upper-lower direction are formed in a protruding manner.

The operation member 22 includes shaft hole portions 42, elastic pieces 43, an acting portion 44, and an operation surface 45. The shaft hole portions 42 shown in FIG. 4 are formed on both sides of the operation member 22, and receive the shaft support portions 32 of the base member 20. As a result, the operation member 22 becomes rotatable, and the drive member 24 can be pressed.

The elastic piece 43 shown in FIG. 5 is a cantilever, elastically comes into contact with the receiving portion 30 of the base member 20, and absorbs an impact when the operation member 22 returns to an original position. The acting portion 44 shown in FIG. 5 extends in a radial direction from the shaft hole portion 42 when viewed in an axial direction, and abuts against the drive member 24. The operation surface 45 is exposed from the exposure opening 14c of the first opening and closing member 14, and receives an operation of the user.

The drive member 24 includes rail grooves 48, a guided portion 50, cam portions 52, and an elastic claw portion 54. The rail grooves 48 are formed on both sides of the drive member 24 and engage with the rail portions 34 of the base member 20. The guided portion 50 is formed in a wall shape at the center of the drive member 24, and extends in a moving direction of the drive member 24. The guided portion 50 shown in FIG. 4 is engaged with the guide portion 36 of the base member 20, and the movement of the drive member 24 in a width direction is restricted. The width direction of the drive member 24 is parallel to a rotation axis direction of the operation member 22.

The cam portions 52 shown in FIG. 4 are formed as paths inclined in the moving direction of the drive member 24 and a sliding direction of the lock bar member 26. The cam portions 52 converts the moving direction of the drive member 24 into the sliding direction of the lock bar member 26.

The elastic claw portion 54 shown in FIG. 5 protrudes toward the bottom surface of the base member 20 and is formed to be bendable. The elastic claw portion 54 is used for assembling the drive member 24 and the lock bar members 26.

The lock bar members 26 each include a first bar portion 60, a second bar portion 62, a lock portion 64, a coupling portion 66, first stepped portions 68, second stepped portions 70, and an engagement portion 72. The first bar portion 60 is formed in a rod shape extending in the sliding direction of the lock bar member 26. The second bar portion 62 extends downward from a front end portion of the first bar portion 60 in a direction intersecting the sliding direction, and connects the front end portion of the first bar portion 60 and a base end portion of the lock portion 64.

The lock portion 64 protrudes from the second bar portion 62 in the sliding direction of the lock bar member 26, and is engageable with and disengageable from the lock hole of the fixed body in response to the sliding of the lock bar members 26. When the lock portion 64 enters the lock hole of the fixed body, the lock portion 64 is locked, and when the lock portion 64 comes out of the lock hole, the lock portion 64 is unlocked.

The coupling portion 66 is formed so as to protrude from the first bar portion 60, and couples the lock bar member 26 to the drive member 24. The coupling portion 66 enters the cam portion 52 of the drive member 24 and is movable in the cam portion 52.

The first bar portion 60 is formed to be long, so that the sliding of the lock bar member 26 can be stabilized. It is preferable that the lock portion 64 is shortened by bringing a base end close to both sides of the opening and closing body 12, This is because, as a length of the lock portion 64 extending in the sliding direction increases, a shape of the tubular portion 14a of the opening and closing body 12 increases, and an accommodation volume of the fixed body decreases. Therefore, the length of the first bar portion 60 in the sliding direction is set to be twice or more, more preferably three times or more the length of the lock portion 64 in the sliding direction. Since the lock portion 64 is not provided with a configuration for engaging with the rail, the lock portion 64 can be formed short.

As shown in FIG. 6, the first stepped portions 68 are formed on both side surfaces of the first bar portion 60 along the sliding direction of the lock bar member 26. The second stepped portions 70 are formed on both side surfaces of the second bar portion 62 along the sliding direction of the lock bar member 26. The first stepped portion 68 and the second stepped portion 70 are formed separately from each other in the upper-lower direction. In addition, a first step portion 80 is formed in an upper portion of the first protruding portion 74a, and a second step portion 82 is formed in a lower portion of the second protruding portion 74b. When the first step portion 80 and the second step portion 82 are not distinguished from each other, they are referred to as "step portion". The first stepped portion 68 and the first step portion 80 face each other in a direction intersecting the sliding direction, and the second stepped portion 70 and the second step portion 82 face each other in the direction intersecting the sliding direction.

The lock bar member 26 is provided so as to be able to abut against the protruding portion 74 at a position sandwiched between the first stepped portion 68 and the second stepped portion 70. The first stepped portion 68 is able to abut against the first step portion 80 of the first protruding portion 74a, and the second stepped portion 70 is able to abut against the second step portion 82 of the second protruding portion 74b. When the opening and closing body 12 is closed, the lock portion 64 hits the fixed body side and generates a rotational torque, but since the first stepped portion 68 abuts against the first step portion 80 and the second stepped portion 70 abuts against the second step portion 82, the lock portion 64 is not easily inclined. In this way, since the inclination of the lock bar member 26 is suppressed by the first stepped portion 68 and the second stepped portion 70 which are separated from each other in the upper-lower direction, it is possible to smoothly slide the lock bar members 26, and it is possible to smoothly perform an operation of closing the opening and closing body 12 and locking the opening and closing body 12 to the locking device 10.

The second stepped portion 70 is formed such that a depth in a facing direction of the pair of facing surfaces 40 is smaller than that of the first stepped portion 68. That is, a depth D2 of the second stepped portion 70 is smaller than a depth D1 of the first stepped portion 68. This makes it possible to reduce the size of the second stepped portion 70 extending in a direction orthogonal to a direction in which the second bar portion 62 extends, so that a decrease in rigidity of the second bar portion 62 can be reduced. The first stepped portion 68 extends in the same direction as the first bar portion 60, so that the first stepped portion 68 can be deeply notched to easily guide the slide.

The first stepped portion 68 extends longer than the second stepped portion 70 in the sliding direction. A rail groove is not formed in the second bar portion 62 having a short length in the sliding direction. As a result, the rigidity of the second bar portion 62 can be ensured.

The first stepped portion 68 and the second stepped portion 70 are formed at positions overlapping with each other in the upper-lower direction orthogonal to the facing direction of the pair of facing surfaces 40 and the sliding direction of the lock bar members 26. This makes it difficult for the lock bar members 26 to rotate in the direction in which the operation member 22 rotates, and makes it difficult for the lock bar members 26 to tilt when the opening and closing body 12 is closed.

The first bar portion 60 has the engagement portion 72 that extends in the sliding direction and is formed in a groove shape. The first protruding portion 74a enters and engages with the engagement portion 72, and guides the sliding of the first bar portion 60. The first stepped portion 68 is formed on an upper surface of the engagement portion 72. The first stepped portion 68 extends over the entire length of the first bar portion 60, and the lock bar member 26 can be stably slid.

Figure 7A:
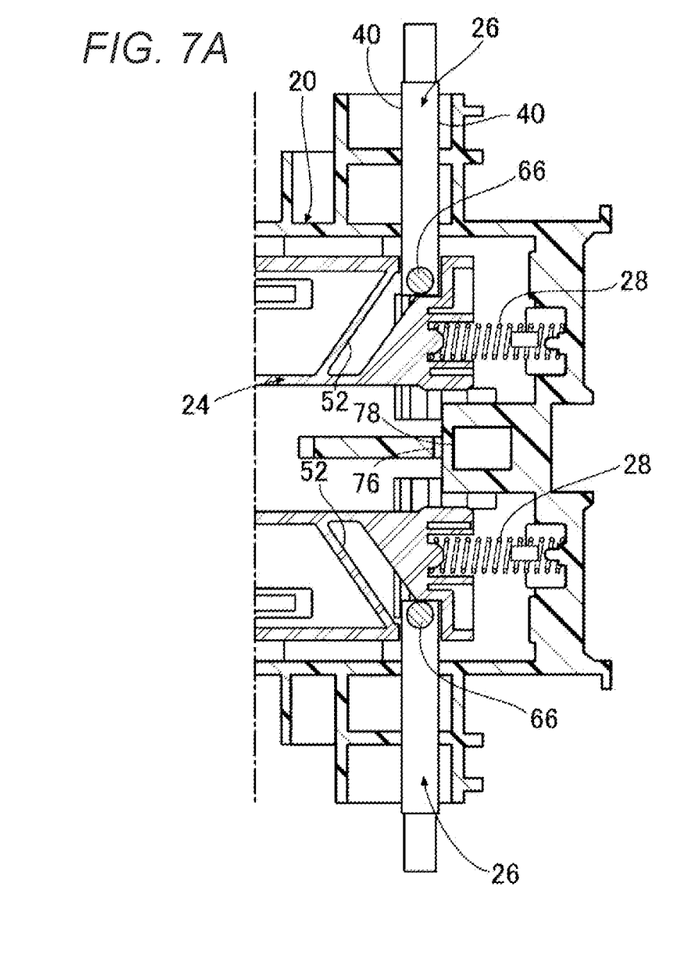
FIGS. 7A and 7B are views showing a state where the locking device is being assembled.
Figure 7B:
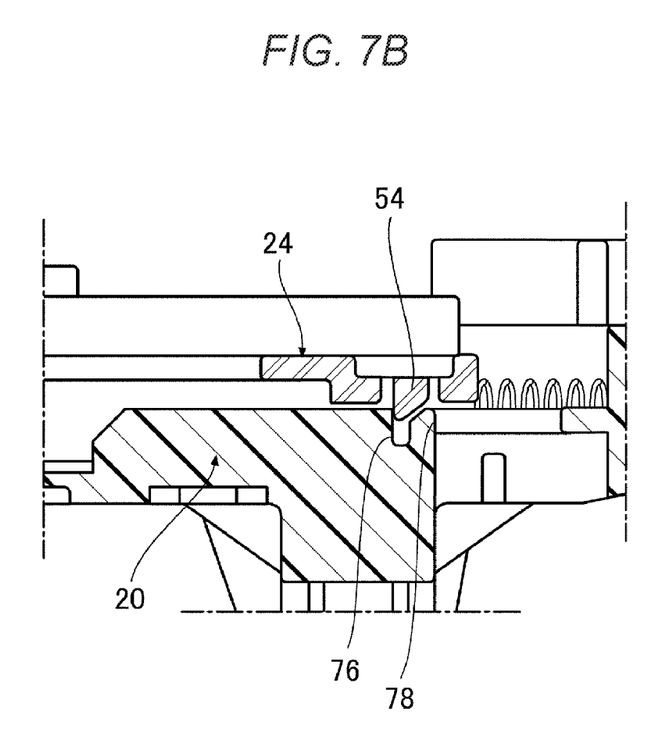

FIGS. 7A and 7B are views showing a state where the locking device 10 is being assembled. FIG. 7A shows a cross section along the moving direction of the drive member 24 and the lock bar members 26, and FIG. 7B shows a cross section at a position the same as the cross section of the locking device 10 shown in FIG. 5.

In a state where the drive member 24 shown in FIG. 7B is pushed against the spring member 28, the elastic claw portion 54 is locked to a first locking portion 76 formed to be recessed in the base member 20, and the drive member 24 is temporarily held. In the state where the drive member 24 is temporarily held, as shown in FIG. 7A, the pair of facing surfaces 40 and the entrance of the cam portion 52 are at the same position, so that the coupling portion 66 of the lock bar member 26 enters the entrance of the cam portion 52 without resistance.

Figure 8A:
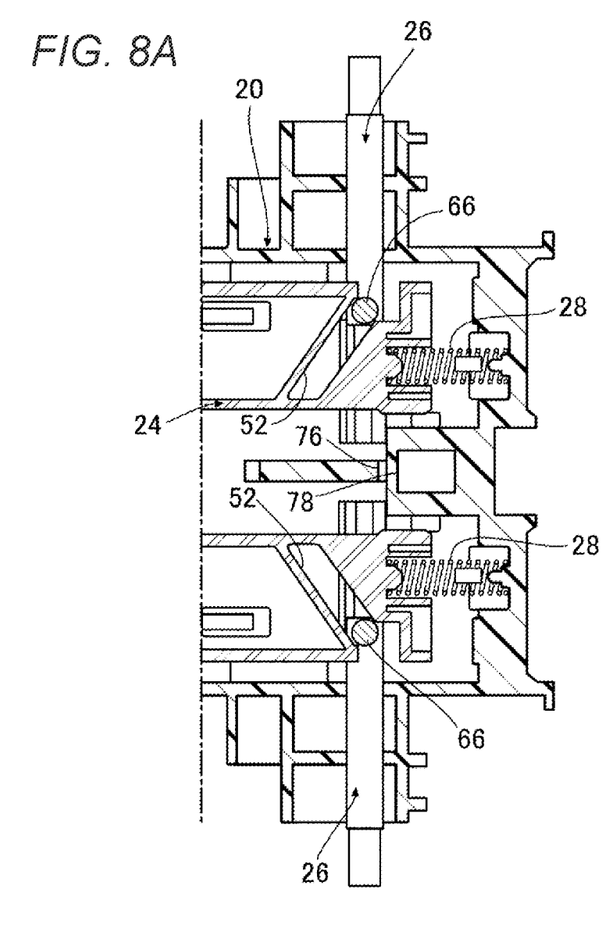
FIGS. 8A and 8B are cross-sectional views of the locking device in an assembled state.
Figure 8B:
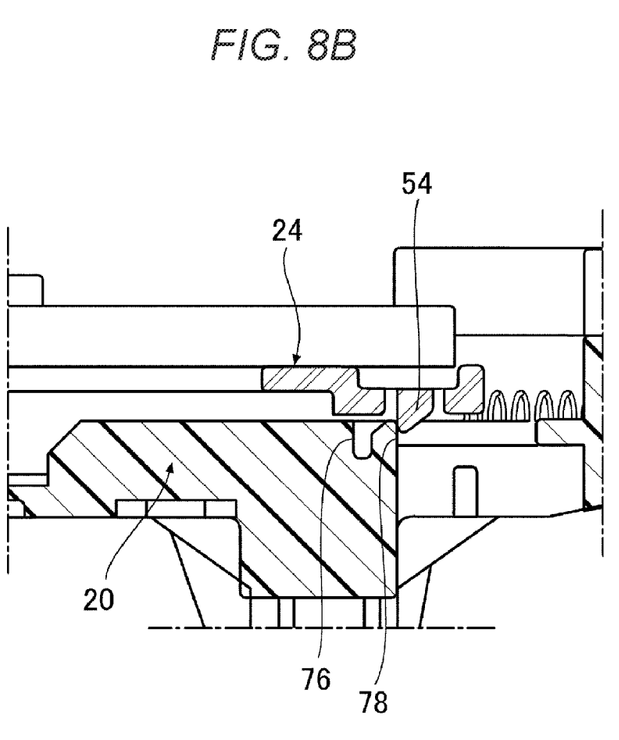

As shown in FIG. 7B, a second locking portion 78 is formed on a deep side of the first locking portion 76. The deep side of the first locking portion 76 is the deep side in a direction in which the drive member 24 is pushed against the spring member 28, FIGS. 8A and 8B are cross-sectional views of the locking device 10 in an assembled state. FIG. 8A shows a cross section of the locking device 10 at the same position as in FIG. 7A, and FIG. 8B shows a cross section of the locking device 10 at the same position as in FIG. 7B.

When the operator pushes the drive member 24 in the temporary holding state toward the deep side against the spring member 28, as shown in FIG. 8B, the elastic claw portion 54 moves away from the first locking portion 76 and is locked to the second locking portion 78. As a result, the coupling portion 66 sufficiently enters the cam portion 52, and the drive member 24, the lock bar member 26, and the spring member 28 are assembled to the base member 20.

In this way, by receiving biasing of the spring member 28 in the temporary holding state, the coupling portion 66 of the lock bar member 26 can be easily inserted into the cam portion 52. When the operator further pushes the drive member 24, the drive member 24 and the lock bar member 26 can be brought into the assembled state where the drive member 24 and the lock bar member 26 are biased by the spring member 28.

The present invention is not limited to the embodiment described above and modifications such as various design changes can be added to the embodiment based on knowledge of a person skilled in the art. Embodiments to which such modifications are added can also be included in the scope of the present invention.

INDUSTRIAL APPLICABILITY

The present invention relates to a locking device to be attached to an opening and closing body that can open and close an opening of a fixed body.

REFERENCE SIGNS LIST 10 locking device
12 opening and closing body
14 first opening and closing member
16 second opening and closing member
20 base member
22 operation member
24 drive member
26 lock bar member
28 spring member
30 receiving portion
32 shaft support portion
34 rail portion
36 guide portion
38 spring support portion
39 box-shaped portion
40 facing surface
42 shaft hole portion
43 elastic piece
44 acting portion
45 operation surface
46 receiving portion
48 rail groove
50 guided portion
52 cam portion
54 elastic claw portion
60 first bar portion
62 second bar portion
64 lock portion
66 coupling portion
68 first stepped portion
70 second stepped portion
72 engagement portion
74a first protruding portion
74b second protruding portion
76 first locking portion
78 second locking portion

The invention claimed is:

1. A locking device to be attached to an opening and closing body configured to open and close an opening of a fixed body, the locking device comprising:
   a base member;
   a lock bar member slidably supported by the base member; and
   a drive member configured to slide the lock bar member by moving in response to an operation of a user,
   wherein the base member includes
      a pair of facing surfaces sandwiching and supporting the lock bar member,
   wherein the lock bar member includes
      a lock portion engageable with and disengageable from a lock hole of the fixed body,
      a first bar portion extending in a sliding direction of the lock bar member, and
      a second bar portion extending in a direction intersecting the sliding direction and connecting the first bar portion and the lock portion,
   wherein a first stepped portion is formed on the first bar portion, and a second stepped portion is formed on the second bar portion, and
   wherein each of the facing surfaces is provided with step portions each of which faces the first stepped portion and the second stepped portion respectively in the direction intersecting the sliding direction at positions sandwiched between the first stepped portion and the second stepped portion.

2. The locking device according to claim 1,
   wherein the first bar portion includes an engagement portion extending in the sliding direction,
   wherein the step portions are each formed in a protruding portion configured to engage with the engagement portion and guide sliding of the first bar portion, and
   wherein the first stepped portion is formed in the engagement portion.

3. The locking device according to claim 1,
   wherein the second stepped portion is formed such that a depth in a facing direction of the pair of facing surfaces is smaller than that of the first stepped portion.

4. The locking device according to claim 1,
   wherein the first stepped portion and the second stepped portion are formed at positions overlapping with each other in a direction orthogonal to the sliding direction.

5. The locking device according to claim 1,
   wherein the drive member is configured to move in a direction orthogonal to both of the sliding direction and the direction intersecting the sliding direction.

6. The locking device according to claim 1,
   wherein the second bar portion extends downward from a front end portion of the first bar portion.

* * * * *